United States Patent
Barkan

(10) Patent No.: US 12,261,863 B2
(45) Date of Patent: *Mar. 25, 2025

(54) PARTIAL BAYESIAN NETWORK WITH FEEDBACK

(71) Applicant: Mordecai Barkan, Palo Alto, CA (US)

(72) Inventor: Mordecai Barkan, Palo Alto, CA (US)

( * ) Notice: Subject to any disclaimer, the term of this patent is extended or adjusted under 35 U.S.C. 154(b) by 964 days.

This patent is subject to a terminal disclaimer.

(21) Appl. No.: 17/238,635

(22) Filed: Apr. 23, 2021

(65) Prior Publication Data

US 2021/0336979 A1   Oct. 28, 2021

Related U.S. Application Data

(63) Continuation-in-part of application No. 16/858,683, filed on Apr. 26, 2020.

(51) Int. Cl.
  *H04L 29/06* (2006.01)
  *H04L 9/40* (2022.01)
  *H04L 41/16* (2022.01)

(52) U.S. Cl.
  CPC .......... *H04L 63/1425* (2013.01); *H04L 41/16* (2013.01); *H04L 63/16* (2013.01)

(58) Field of Classification Search
  CPC ..... H04L 63/1425; H04L 41/16; H04L 63/16; H04L 41/0893; H04L 41/0631; H04L 41/14; H04L 41/149; H04L 63/145; H04L 63/0428; G06F 21/552
  See application file for complete search history.

(56) References Cited

U.S. PATENT DOCUMENTS

| | | |
|---|---|---|
| 7,685,278 B2 | 3/2010 | Cohen et al. |
| 9,210,576 B1 * | 12/2015 | Cope .................... H04W 12/128 |
| 10,108,168 B2 | 10/2018 | Gendleman |
| 10,893,004 B2 | 1/2021 | Tillotson |
| 10,893,059 B1 | 1/2021 | Aziz et al. |
| 10,893,064 B2 | 1/2021 | Menon et al. |
| 10,893,402 B2 | 1/2021 | Dames et al. |
| 11,924,238 B2 * | 3/2024 | Fellows .................. G06N 20/00 |
| 2013/0051248 A1 * | 2/2013 | Pei ....................... H04L 41/0618 |
| | | 370/245 |

(Continued)

OTHER PUBLICATIONS

A Tutorial on Inference and Learning in Bayesian Networks, By Irina Rish, IBM T.J.Watson Research Center.

(Continued)

*Primary Examiner* — Mahfuzur Rahman

(57) ABSTRACT

Typical implementations of anomaly detection algorithms as means to detect failure of elements of the network are based on excessive processing due to AI and machine learning techniques adopted for big data analysis. Contrary to such approach, careful study of a network, particularly sensor and actuator rich network, allow for an efficient implementation-lower processing requirements and achieving better ratio of Probability-of-Detection (PD) to False-Alarm-Rate (FAR)—by segmentation of the data layers (grouping) and implement processing on smaller groups of data, eliminating unnecessary data values that add to the "noise". Two different anomaly detection algorithm are employed: one detects anomaly of system and the other identifies defected programs, particularly by malware.

9 Claims, 4 Drawing Sheets

(56) References Cited

U.S. PATENT DOCUMENTS

| | | | |
|---|---|---|---|
| 2014/0230911 A1* | 8/2014 | Hirata | G01F 15/005 |
| | | | 137/486 |
| 2015/0060673 A1* | 3/2015 | Zimdars | G01S 13/0209 |
| | | | 250/341.2 |
| 2019/0132741 A1* | 5/2019 | Stone | G06F 3/02 |
| 2019/0318099 A1* | 10/2019 | Carvalho | G06N 3/08 |
| 2020/0358810 A1* | 11/2020 | Fellows | H04L 63/1433 |
| 2021/0058154 A1* | 2/2021 | Musumeci | H04B 10/0793 |
| 2021/0081501 A1* | 3/2021 | RoyChowdhury | G06F 40/295 |

OTHER PUBLICATIONS

Reactive Bayesian Network Computation using Feedback Control: An Empirical Study. Ole J. Mengshoel, Abe Ishihara, and Erik Reed, Carnegie Mellon University, Moffett Field, CA 94035.

Adaptive Importance Sampling—The past, the present, and the future. By Monica F. Bugallo, Victor Elvira, Luca Martino, David Luengo, Joaquin Miguez, and Petar M. DiuriC. IEEE Processing Magazine I Jul. 2017.

Distributed Estimation Under Sensor Attacks: Linear and Nonlinear Measurement Models IEEE Transactions on Signal and Information Processing over Networks ( IF 3.153 ) Pub Date : Jan. 29, 2021 , DOI: 10.1109/tsipn.2021.3054981 Min Meng, Xiuxian Li, Gaoxi Xiao.

A Comparative Evaluation of Unsupervised Anomaly Detection Algorithms for Multivariate Data. By Markus Goldstein, Seiichi Uchida. Plos One, DOI: 10.1371/journal.pone.0152137, Apr. 19, 2016.

* cited by examiner

PARTIAL BAYESIAN NETWORK WITH FEEDBACK

CROSS REFERENCE TO RELATED APPLICATIONS

This application is a continuation-in-part of U.S. patent application Ser. No. 16/858,683, filed on Apr. 26, 2020 and titled "Program verification and Malware detection", which is a continuation-in-part of U.S. patent application Ser. No. 15/675,611, filed on Aug. 11, 2017 and titled "Secured Automated or Semi-Automated Systems", which is a continuation-in-part of U.S. patent application Ser. No. 15/499,848, filed on Apr. 29, 2017 and titled "Access Management and Credential Protection", which is a continuation-in-part of U.S. patent application Ser. No. 14/606,992, filed on Jan. 27, 2015 and titled "Secure Computer Architectures, Systems, and Applications," which is a continuation-in-part of U.S. patent application Ser. No. 14/040,352, filed on Sep. 27, 2013 and titled "Secure Computer Architectures, Systems, and Applications," which claims the priority benefit of U.S. Provisional Application Ser. No. 61/744,677, filed on Oct. 2, 2012 and titled "Computer Architecture, System and Applications," and this application claims the benefit and priority of U.S. Provisional Patent Application Ser. No. 61/965,313 filed on Jan. 28, 2014 and titled "Add-on To Existing Computing Systems to Enhance Their Security", and this application claims the benefit and priority of patent application Ser. No. 15/675,611 filed Aug. 11, 2017 and titled "Secured Automated or Semi-Automated Systems", and this application claims Provisional Patent Application Ser. No. 62/818,374 filed on Mar. 14, 2019 and titled "Process Malware Detector", and this application claims Provisional Patent Application Ser. No. 63/015,517 filed on Apr. 25, 2020 and titled "Partial Bayesian network with feedback", all of which are hereby incorporated by reference herein in their entireties, including all references cited therein.

FIELD OF THE INVENTION

Embodiments of the disclosure relate to computer security. More specifically, but not by way of limitation, the present technology provides secure computing architectures, systems, networks, and applications. In some embodiments, the present technology employs both trusted and legacy hardware environments that protect programs and processes executed by computing systems and devices to support security, privacy, and safety. Specifically, the solution will identify malware infecting computer's programs.

BACKGROUND

Protection against malware infecting networks of computing systems is a growing challenge as software solutions are added-software solutions that by their existence farther increase the surface of attacks and potential infection due not only to vulnerabilities-human nature is a major cause of failure: error, carelessness or malicious. The nature of the networks is such that infection of a network node which is regarded trusted leads to exposure of the entire network.

There is a growing malware detection solutions based on anomaly detection which is meaning, evaluation and analysis of multitude pieces of data derived from the network communication and content to identify what is regarded normal operation or acceptable states and from their deviations are regarded as anomalies that could indicate existence of malware. It is important to note that one challenge to serve as a Malware detection means is to discriminate between modification of processes and malfunctioning of the system. Another challenge is to avoid failure of a process, if because of a design error (bug) or malware, to cause unrecoverable damages and state.

Typical implementations of anomaly detection algorithms as means to detect failure of elements of the network are based on excessive processing due to AI and machine learning techniques adopted for big data analysis.

The typical function of training is a demanding process with computational requirement growing exponentially with the number of data values analyzed. Every modification of the network requires retraining-even an improvement of programs that introduce modified or new data values.

The application of the training results, sometimes referred to as prediction, is also depended on the number of data points analyzed by an AI instance. Pruning is another algorithm that is employed to reduce the number of data points to be analyzed. This process is impacted by the quality of the data and could be suboptimal compared to pruning that is made based on the specific network structure and data flow.

Contrary to such approach, careful study of a network, particularly sensor and actuator rich network, allow for an efficient implementation-lower processing requirements and achieving better ratio of Probability-of-Detection (PD) to False-Alarm-Rate (FAR)—by segmentation of the data layers (grouping) and implement processing on such smaller groups, eliminating unnecessary data values that add to the "noise".

Anomaly detection another challenge is to locate the source of the failure. Anomaly Location requires refined analysis which is beyond the "simple" anomaly detection and is essential to provide value to the detection process since every detection needs to follow an evaluation of potential damage and requires an appropriate reaction.

There are description of solutions for networks that describe anomaly detection of layers similar to the way suggested here for layer analysis. What is missing in those solution is how EXACTLY to locate faulty programs and particularly how to find which programs are infected with malware. The essence of the suggested innovation is how to detect the infected programs in a systematic way. Other innovations by the inventor expand on the secure process to implement such detections.

Sufficient and Necessary Conditions for "Anomaly Detection" of Software Programs:

For a given input to a program process, the comparison of actual output (processed input) to expected output (determined by computational means and/or simulations and/or machine learning/AI techniques) serves as sufficient and necessary conditions to determine the faultiness of the process due to development error or contamination by malware. Many of program errors are detected in the development phase; remaining program errors are detected or found after the program has been fielded. Fielded programs are updated and upgraded with new features to allowing for early sales of software products even if not fully verified. The mechanics for updates and upgrades are allowing for malware infection-most "errors", these days, are related to vulnerabilities to cyber-attacks. To defeat the risk posed by such vulnerabilities exposing systems to malware and hacking attacks, updates and upgrades of programs are made periodically.

It is evident today that infection of software by malware is inevitable. The system needs to be designed to withstand "successful" infection and malware/hacker action and support recovery.

In the following, a person skilled in the art will be taught how to IMPLEMENT, with the knowledge of other related patents and solutions in the field, a solution to allow network of computing devices, and particularly ICS and IoT networks, to be protected against the threat of infection by malware of component-study the network elements (statistical behavior-mathematical functions, simulations, training and online real time refinements), detection, containment and blocking of infected components, backup operation, clearing and refreshing of infected programs, and return to normal operation.

This patent focuses on machine and method to detect malfunction of a sensor/actuator networks that takes advantage of combining localized detection of malfunctioning of software components with the general behavior and state of the network to identify failures of specific components or general operation of the network.

Some Software Components that May be Infected:

Here is a list of potential software components that may be infected and how they may cause failure:
1. Sensor measurements processing-malware could have two effects: Altering measured value to result erroneous actions and decisions or attacking the network, Distributed Denial of Service (DDoS)
2. Action command processing-malware could alter the action to cause damage and based on the communication to the network could also participate in DDOS attacks
3. Controllers infection and other chain nodes-could alter content and participate in DDOS attacks
4. Monitoring-alter presentation and display to operator causing erroneous decisions and actions
5. Actions-altering commands and actions of users to result damage to the system components and users The contamination of such processes/programs by malware is caused by network vulnerabilities and actions made by users/administrators/operators/managers erroneously, careless actions, or even malicious.

The purpose of the innovation is to protect the network from damaged/mal-operating components such as infections by malware when successful given the high potential penalty monetary or life threatening-death and injury or hardware and software that has been deteriorating operation with time and require maintenance or repair The detection of malware in specific software components (or development errors-bugs) is solved and described in details in another patent where evaluation of input against output based on expected statistical relation between the two determines if the software serves properly its purpose.

SUMMARY OF THE DISCLOSURE

Layered Anomaly Analysis

This innovation optimizes the monitoring operation of the network by taking advantage of localized detection of infected software processes/programs. For demonstration, sensors and actuators device networks will be considered.

The innovation is adoptable to any data analysis process where the data flaw may be organized in a layered manner. This is typically the case of a sensors systems where the physical system(s) state is monitored by means of sensors. The state of the system may be determined only by means of the measurements made by the sensors. In ICS/SCADA systems it is related to as the 0 level. By studying and analyzing this layer anomaly of the physical system state may be derived. The studying of such data and development of models and normal operation is well covered—from mathematical modeling by sensors behavior, simulations, machine learning of historical data or during the operation in real time.

The sensor data typically is processed and this processing result a new layer of data. The discussion of FIG. 3 describes in details a certain embodiment of an ICS/SCADA system and the many layers that may derived.

Other data collection systems may also benefit from the innovation though details of implementation are not provided the following simple example will convey the idea and any person skilled in the art will know how to apply it to any data collection system that enjoys a layer structure.

Assume a goal to develop psychological thinking patterns of the human brain to predict behavior. For this purpose, a set of questions is designed. The questions (text, images, video, voice, audio, touch . . . ) are presented to a person under test by means of a computer. Responses keyed by the person (or others such as said or other means) determine the thinking patterns. Analysis for such responses for a large group will determine typical and anomaly thinking patterns with various certainty (distribution probability). By continuous refinement of the analysis by means of real time machine learning, as more persons are tested, the ability to predict thinking patterns and as result behavior is improved.

There are at least three layers—the questions ("actuation"), responses ("sensing") and presentation. Anomaly may be detected in each layer without need of information from other layers. The other layers contribute to refinement of results derived from a single layer. Existing approaches that lump all the information from the layer as ONE BIG SOURCE and analyzing it as a whole to determine normal and anomaly is not only placing a great computational demand but also introduces NOISE to the process.

With controlled layers, the innovation applies.

On the other end, dealing with information like the weather or stock market, it is challenging to identify controlled layers.

To summarize-A data that is derived in a controlled manner may be layered and support an effective analysis and allow for educated action.

Individual sources such as sensors-hardware trusted environments are attached to processes, which get raw sensor measurements as input and provide as output processed sensor measurements, and those trusted environments receive as input the raw and processed sensor measurements. The trusted environments support detection of infected processes or programs by comparing the two and evaluation based on statistical correlated distribution. Statistical correlation between the raw and processed sensor measurements is developed based on a mathematical description of the operation of the sensors, simulations or machine learning of pre-fielded or fielded sensor systems. The result is detection of anomaly operation of the software/program when infected with malware. The evaluation of Input to Output of a process/program is sufficient and necessary condition to detect mal-operation of the process/program.

Grouped sources—the group of ALL raw sensor measurements OR the group of all processed sensor measurement are sufficient and necessary to determine anomaly behavior of components of such groups. The layers will be defined based on the type of information they carry, as will be described in more details hereafter. Potentially, for each layer legacy anomaly detection techniques will be employed using AI and machine learning techniques-training and online processes that set the normal states and the operation exception (anomaly) states.

The following discusses various "data layers" that could serve the need for necessary and sufficient conditions for Anomaly Detection. It is important to distinguish between "detecting an Anomaly" and the identification and localization of an infected component or process. For the first one the analysis of a single layer may suffice, for the later all layers might need analysis.

By mixing localized anomaly detection-specific programs/processes monitoring by means of a trusted environment—with "anomaly detection" and then develop techniques to locate infected components (devices, processes/programs), a person skilled in the art may develop means that will defeat malware before irrecoverable damage, in a timely and effective manner, while the network recovers and returns to normal operation.

Raw sensor measurement-though this layer could be used to detect anomaly it might require heavy processing. Thus other options are suggested for actual implementation.

Processed sensors measurements layer—By analyzing the processed sensor measurements, a clear state of the network may be utilized to establish the norm states limits and proper boundaries with statistical functions and levels to assign probabilistic behavior of the anomaly states and determine probability of infection that will derive decisions on required or suggested action. The anomaly detection relates to Data and Communication, where the Data anomaly could indicate a process/program contamination and Communication anomaly may indicate a DDOS attacks.

Fused sensors measurements layer—the integration of several measurements to create a unified single measure may present another layer. Fused sensors measurements are for example distance where Radar, Lidar, and/or ultrasound three different measures are used to determine a value as best estimation of distance—as may be found in collision avoidance measures for cars. The grouping will be of the various measurement and evaluation of their consistency on top of anomaly detection.

System state layer—this may be based on various measureable elements that evaluate the network state as a whole. Detection of anomaly will point in direction for more granular investigation.

Presentation layer—this is the group of data presented to operators of the system. Certain relation between the various values is expected and serves as the base to anomalies detection.

Command layer—the operator may issue commands which on their own present a potential for evaluation of anomalies. Correlation with the Presentation layer is expected and the anomaly detection may combine between the two. Action by operator(s) (commands) is taken based on presentation.

Action layer-based on commands actions for actuators are generated by processes/programs. Those may be infected and may be correlated to specific elements of the Command layer. By evaluating Action against Command malfunctioning of process/program is detected and particular of interest are the potential contamination by malware. The anomaly again could be related to data (altering commands) or communication (DDOS attacks).

Segmentation

The network data may be segmented based on the localized malware (or bugs) detection possibilities. By proper segmentation the amount of computation to detect anomaly and from there the source-malware or component defect-will be greatly reduced, the reaction time minimized and optimized to avoid irrecoverable damage, the probability of detection improved for a set false alarm rate.

1. Raw and processed, sensor measurements.
2. Actuators command and actions.
3. In general, Input and output pairing layers.

DETAILED DESCRIPTION

Figure 1:
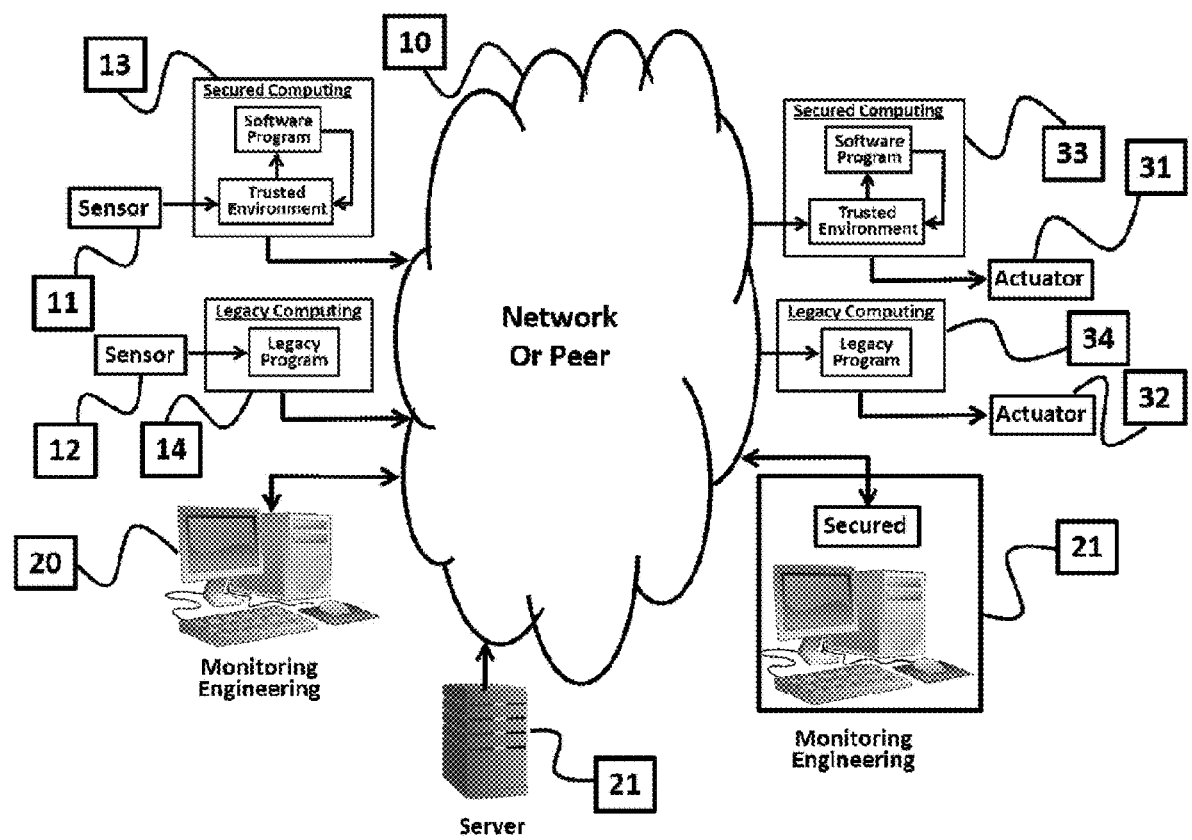
FIG. 1 Depicts a typical ICS/SCADA network that includes secured and unsecured elements.

In the following description, for purposes of explanation, numerous specific details are set forth in order to provide a thorough understanding of the disclosure. It can be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It can be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. It is noted at the outset that the terms "coupled," "connected", "connecting." "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Advantageously, the present innovation remedies the vulnerability of legacy computing systems, for example, legacy computers such as personal computers (PCs), notebooks, smartphones, PLCs, RTUs, and other computing elements of an Industrial Control System (ICS) and so forth. Vulnerabilities are caused by placing the processor and operating system (OS) of the computing device as the central computing component, which is exposed to each operation executed by the computing device.

Further, it is difficult, if not impossible, to protect these legacy systems when a user encounters or downloads malware into the system. In non-limiting examples, malware may masquerade as a legitimate user by copying authentication information Of the user, Often without their knowledge. In other cases, altering programs operation to modify sensor measured values or actuator commands. Also, the malware may transfer information to remote locations and expose sensitive information of the user to fraudsters. The above scenario is merely exemplary and many types of malware such as spoofing, phishing, Trojan horses, man-in-the-browser attacks, and other fraud-driven or malicious activities that would be known to one of ordinary skill in the art are also remedied by the present technology.

These vulnerabilities may be overcome by abandoning a single CPU (processor and OS) computing architecture. The present technology contemplates computing architectures, systems, and devices that include a plurality of computing environments that are physically and/or logically separated from one another in such a way that the security, privacy, and safety of the users' sensitive information is preserved.

As is used throughout this disclosure, the term "sensitive information" may include any information that is input into, processed by, output from, or transmitted by a computing device that affects the security, privacy, or safety of a user or device. Sensitive information may be understood to include personal information, personally identifiable information, intellectual property, or any other information that could be used maliciously, which would be known to one of ordinary skill in the data privacy and data security arts. Exemplary and non-limiting examples of sensitive information can be described in greater detail infra, with reference to various exemplary use cases for the present technology. In some embodiments, the present technology may be embodied in a computing device that provides a trusted computing environment and one or more legacy computing environments. The trusted computing environment is generated by a trusted environment/component, which contains a hardware portion such as a central processing unit (CPU) and a software portion having an OS, application program interface (API)/drivers, and optional trusted applications, which will be described in greater detail herein.

Before discussing the details of the innovation regarding processes and software programs carried out by legacy computing systems, the legacy environment is presented in details to allow better understanding of the specifics of the innovation.

Computer systems are rich with various programs to process data. Each program (process) makes use of input data and after processing it provides output data. The complexity of the programs and their sophistication requires updates and upgrades, which introduces the risk of infection by malware.

Figure 2:
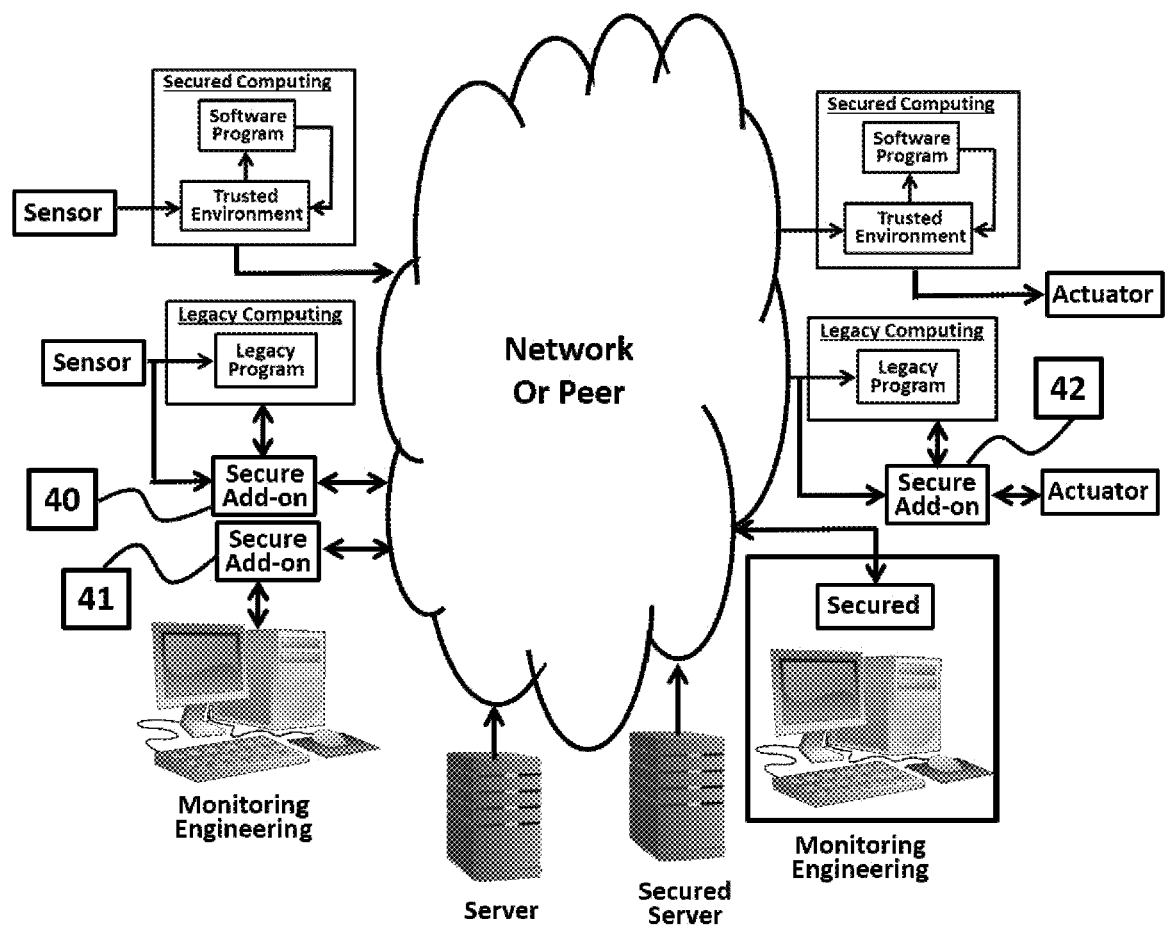
FIG. 2 Depicts the network of FIG. 1 upgraded to secure all elements.

It is emphasized that the two general architectures presented and discussed in FIG. 1 and FIG. 2 are just exemplary to allow for a person skilled in the art to appreciate the breadth of the potential varieties and potential designs for legacy and trusted computing systems and elements.

FIG. 1. Depicts a sensor/actuator network representing an ICS/SCADSA network in a simplified form. Any person skilled in the art may expand the explanation to other practical implementations and embodiments that, might use different types of components such as PLCs RTUs and other types of computing systems. The monitoring and engineering may be carried out by workstations, PCs, notebooks, tablets, smartphones and any type of device designed for such.

The network 10 represents means of communication that could be a simple peer-to-peer communication. In the FIG. 1 it communicates between the various components as will be described hereafter.

The system depicted in FIG. 1 includes secured elements and unsecured elements. Since the purpose of this innovation is the protection of a network from malware (the suggested innovation could also detect in general faulty programs that were a result of updates and upgrades that caused defect software/programs) in FIG. 2 we present the conversion of the unsecured elements to secured and in this way allow the full benefit of the suggested innovation. This possible and optional conversion is described in many details in other patents.

The secured elements that are connected to the network 10 are:

Sensor 11 communicates with the network 10 via a secured computing system 13. The secured computing system 13 includes a trusted environment, physically separated from a legacy computing element that executes the software program that process the sensor 11 measurement.

Sensor 12 communicates with network 10 via legacy computing system 14. The legacy computing system 14 includes a legacy program that process the sensor 12 measurement.

Actuator 31 controlled by secured computing system 33. Secured computing system 33 includes a trusted environment, physically separated from a legacy computing element that executes the software program that process an actuator command received from the network 10 to generate an actuator action that is fed into the actuator 31.

Actuator 32 controlled by legacy computing system 34. Legacy computing system 34 includes legacy software program that process an actuator command received from the network 10 to generate an actuator action that is fed into the actuator 32.

The operation of the physical system (not presented in FIG. 1), measured by the sensors 11 and 12 and controlled by the actuators 31 and 32, is monitored by means presented in FIG. 1 as Secured Monitoring Engineering 21 and legacy Monitoring Engineering 20.

The Monitoring Engineering stations 20 and 21 allow operators to maintain the proper operation of the system, verifying normal operation and respond to anomaly. Monitoring information displayed based on the processed sensors 11 and 12 and result generation of commands to modify the state of the physical system (not presented in FIG. 1), by means of the actuators 31 and 32.

The server 21 represents network resources that are used to store data such as—programs backup, historical information, forms, operational procedures, etc.

FIG. 2 depicts potential enhancement to the network 10 of FIG. 1 by adding securing elements.

Secure Add-On 40 secures the legacy computing system 14 of FIG. 1

Secure Add-On 41 secures the unsecured Monitoring Engineering 20 of FIG. 1

Secure Add-On 42 secures the legacy computing system 34 of FIG. 1

A secured server may be added as well-depicted in the FIG. 2

Any person skilled in the art will be able to interpret the above into various types of system and network to secure existing network or improve new deigns.

The reason of the enhancement as depicted in FIG. 2 emphasize weakness of existing systems that needs to be implemented to really benefit from Anomaly Detection algorithms. Anomaly Detection algorithms, implemented for the purpose of detecting malware in networked systems, will be defeated by sophisticated well-crafted malware if the network edge elements are not secured.

Worth noting that to achieve security, hardware elements need to be combined with legacy systems supporting functions of—effective monitoring, detection before damage, contain and block infected legacy systems, support backup operation, allow for safe recovery over the network, inline testing.

These are covered and described in details in other patents.

Figure 3:
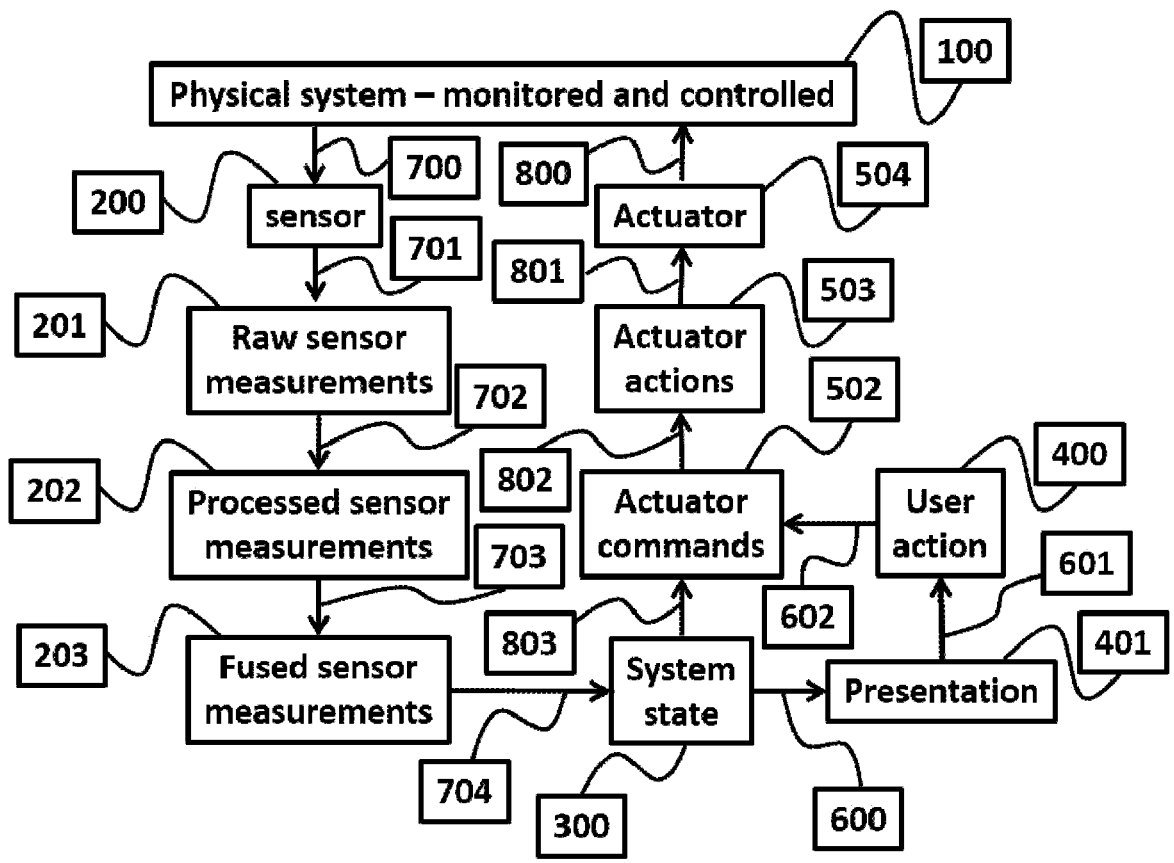
FIG. 3 Depicts the layered organization of an ICS/SCADA network.

FIG. 3 depicts the essence of the innovation-a layered structure of the functional operation of a typical sensors/actuators network (ICS/SCADA, electronic car, home automation, IoT network, electric grid . . . )

The layers of functional operation of sensors/actuators network depicted in FIG. 3 are representative to applications, systems, and networks in numerous cases. The elements of the network may be characterized by cause/effect relation-if the physical system or a software program that receives input data and results processed data. Any person skilled in the arts will be able to create such functional relation of the data flow in the network (application/system). It will emphasized again-such dissection and segmentation of the data flow between various elements of the system has several benefits:

1. Computation load will be reduced greatly by focusing on smaller data sets and develop statistical relations that are maintained between smaller data sets.

2. By focusing only on relevant grouped data sets the accuracy and probability of differentiation between normal and anomaly is improved greatly and allow for better control of probability of detection vs. probability of false alarm rates.

3. Effective detection and fine tuning will allow for detection and response before damage occurs and triggering of a backup operation.

4. The organization of the anomaly detection process will support the detection of programs infected with malware even if multiple of them are infected.

The key to an effective detection and location (specific infected program) is the fact that necessary and sufficient condition to identify a program infected with malware is evaluation of input against output of the program, particularly when anomaly detection algorithms are employed.

The probabilistic nature of anomaly detection algorithms and feedback to sensing into actuator leads to the use of the term Bayesian loop network Bayesian Loop Network FIG. 3 depicts the general functional flow between the various layers and the communication between them. As emphasized before this is just an exemplary embodiment that may be applied to other similar network or processes. Each layer is derived from another layer and they are looping in the feedback implementation. The sensor layer measures are processed to determine the physical system state. Based on this physical system state the actuator action layer is generated to modify to a desired state which in return results a new set of raw sensor measurements-thus the feedback.

Each layer serves as a source to the next layer—the outcome layer, as will be apparent from the detailed discussion to follow. Each layer's values have probabilistic relation to the source layer values from which it was derived. The probabilistic nature of a layer's value provide the base for anomaly detection.

The probabilistic behavior is developed based on functional and mathematical formulas when possible. By means of simulation such probabilistic relations may be developed, particularly for programs and processes. In more complex cases the probabilistic nature of a layer's values is based on studying and analyzing actual measurements-offline or in real time—by means of machine learning means or others. Such probabilistic nature may be refined during the operation of the network/system in various ways as described in details in the literature.

It is emphasized that the innovation is not suggesting new ways to determine the probabilistic nature of a given set of data—the innovation is centered around method that suggest segmentation of a large data sets into smaller data sets for evaluation with a method that takes advantage of understanding in details how data is created in a system/network and how various data values are related. This leads to the benefits as described above.

Segmentation is made by partitioning the data flow in a network to portions that include input layer of data set into computing elements or physical means (the processing layer) that modify the input data set to create an output layer data set.

Termed here Bayesian networks means that models and methods may be developed, allowing for processes that derive probabilistic relations between input layer, source layer, to output layer, the result of the processes or physical elements.

To determine an anomaly behavior of the network as whole it will be enough to evaluate a single layer that presents a total description of the dataflow in the network. Well studied techniques support the development of Normal and Deviant states with proper probabilistic relations. This will be apparent to any person skilled in the art from later discussion. This will be an indication of a possible failure of the system manifesting in anomaly behavior. This will not provide information on the source of the failure Well studied techniques are implemented to develop the probabilistic relations between input and output layers; particularly the false alarm rate will require evaluation of large amounts of values due to the rare "anomalous" occasions. One such family of techniques is termed Importance Sampling—where behavior is modified into measureable and predictable occurrences of events. It is not the purpose of the invention to develop means to derive probabilistic relations between data sets. The innovation focuses on methods of segmenting a network into layers that will allow effective, accurate, and processing and memory efficient implementation made possible.

This will provide indication for a malfunction of a process or physical element.

Emphasis on Interlayer Correlation

Following are examples of suggested segmentation. It is well understood that detection of anomaly in a certain layer will be propagating into other layers or may be a result of anomaly in another layer. It is also important to differentiate between the causes of anomaly to allow the proper response—

1. Mal operation of a physical system—the monitored physical system, the sensors, or the actuators that will usually require replacement or adaptation of processes/programs
2. Process/program failure-usually may be repaired by means of an update or upgrade of software programs
3. Alteration of data of input layers or output layers communicated to/from physical/process layers.

Raw sensors measures input layer into a layer of programs to result processed sensors measures layer. The probabilistic behavior of the processed measures will be used to determine anomaly of the network. Relation between the raw and processed measures is determining if a processing program fails and causes the anomaly (this will be typical result of malware infecting such process/program)

Processed sensors measures with fused sensors measurements—this process optimizes the individual sensors measurements by taking advantage of correlation between them to reduce the noise and error. Anomaly of the input layer, the processed sensor measures, will propagate into the fused information derived by means of the processing layer. Malfunction of the process (bug in a program or malware infection) will modify the fused output layer values even if the input layer of the processed sensors measures is normal (adheres to the expected statistical values of system operation).

Actuator command layer is the input to a processing layer that generate actuator action layer. Infecting these processing/programs layer will result actuator operations that will cause damage.

A critical layer flow to which typically there is no direct access are the three typical physical layers-Actuator action input layer to the actuator layer results actuator operation that will cause modification of the physical system layer—the state of the system. This will lead to a physical system state layer which is measured by the sensor layer. The sensor layer generates the raw sensors measurements layer.

Time Relation

Evaluating normal values over time, as they change, will not only help with predict deterioration of operation and needs for repairs. With time, reference to anomaly may be updated to reflect on changes in what is still consider normal operation while physical systems are aging.

Though collection of information is based on individual sampling time and periods the evaluation could be across time for the various input and output layers-couple of examples:

1. Time varying information of location or position could be used to calculate (a process example) velocity vector (value and direction).
2. Velocity information can be used to calculate acceleration vector (change in velocity) and force vector (based on mass or pressure sensors-value and direction).
3. For a heated chamber (gas turbine), pressure, temperature and volume are related to mass and flow.

Changes with time could allow corrupted software carefully crafted (malware) to cause a calculated damage while avoiding revealing the source of corruption.

The differentiation between deterioration and malware action may be made by means of anomaly detection of a groups of data (layers) that represent the system state.

Layer Anomaly-Generating Base Patterns

Probabilistic relation between input layer to a program/process layer and the output layer may be determined in several ways:

1. Computed anomaly-functional and mathematical analysis will allow to detect variations from a normal state with a given probability of detection (PD) and probability of false alarm rate (PFAR).
2. Simulated anomaly—by running numerous cases of input data layer and match it with the resultant output data layer, a statistical relation and measure may be developed with estimates of PD and PFAR
3. Measured-utilizing machine learning techniques, training and during operation analysis of input data layer and/or output data layer will allow defining baselines to differentiate between normal operation and anomalies. This techniques provide crude information with regard to PD and PFAR.

To detect anomalies the evaluation of a single layer will suffice. To identify the specific process/program infected and causing an anomaly additional evaluation will be needed, evaluation of relation between input layer members to output layer members.

Securing a Network

FIG. 2 depicts a preferred embodiment of the suggested solution incorporating secured element that support localized anomaly-detection capabilities that may be integrated into the global Bayesian network with feedback. Supporting effective and timely detection of malware, allowing for accurate and speedy reaction with backup operation. The use could support automatic reaction without the need of operator involvement, which is a source of slow response and source for errors or careless operation. The operator could be an insider with malicious intention and action.

In a preferred embodiment each process is evaluated to be secured by integrating or adding a trusted environment (secure add on). The monitoring stations are secured with the assumption that they are manned and the trusted environment support such functions as: Authentication, session integrity, and content validation.

FIG. 3 will be discussed now in details. Emphasized again, any person skilled in the arts will be capable to adopt the approach as described here to other networks where the data flows from one layer to another and adopt a process data to derive anomaly based on which a structure operation may be carried out to specific programs infected with malware accurately and efficiently with high fidelity.

Adding and implementing the networks with the edge device secured adequately, monitoring may carried out effectively, detection of malware made before damage, malware shielded from the network to avoid DDOS attacks, back up operation supported allowing for implementation of refresh of infected programs and return to normal operation.

Though a network 10, FIG. 1 is not presented in FIG. 3, the flow of data is made possible by means of the network 10 and its use will be apparent to any person skilled in the arts without further discussing it. The following discussion focuses on layers that allow for effective implementation of anomaly detection algorithms.

The Physical system layer 100-monitored and controlled by the network elements, will be referred to as the physical system 100 henceforth.

The physical system 100 may represents any type of core physical system that may be monitored with sensors and/or acted upon with actuators-electrical generator of any type (gas, wind, solar, nuclear . . . ) car, home, transportation, human brain, robot, human body. This is the core of network around which the network is made to assure its proper operation.

The communication between the physical and process/program layers is exemplified by the connections layers which serve as input and output layers between the network elements/layers 600, 601, 602, 700, 701, 702, 703, 704, 800, 801, 802, and 803.

Worth noting that the approach may be adopted also in cases where there are not actuators or even analog sensors—an example is a home security system that provides alerts but there are not actuators to respond to a breach by undoing it or education institute that teaching leads to learning and from there to testing that leads to teaching.

In the following an electric gas generator will be presented as an example to a physical system 100

Gas generator sensor 200 layer may include the following sensors-temperature, pressure, gas flow, vibration, current, voltage, frequency, and phase. External sensors could provide information about the environment that could impact the gas generator 100 operation: temperature, humidity, pressure The sensor 200 layer is a physical layer of sensors that measure the physical system 100 state.

The gas generator 100 state is measured by the sensors—this transfer of "information" to the sensors is exemplified by the connection 700, the physical system state input layer to the sensors layer 200.

The sensors result an unprocessed raw sensor measurements layer 701. Those measurements indicate the state of the gas generator 100 (physical layer). Usually they are noisy and are going through an analog processing 201. The output from layer 201 is the raw sensor measurement layer 702.

The processing of the raw sensor measurements layer 702 is an input to processed sensor measurements layer 202. The processing is carried out by computing systems that provide a processed sensor output layer 703 to allow determining an accurate state of the gas generator (the physical system) 100.

The processed measurements layer 703 is an input layer to further processing layer fused sensors measurements layer 203 that result the fused measures output layer 704

The fused sensors measurements layer 203 is an input to the system state processing layer 300 that determines the state of the gas generator (physical system) 100 and result two groups of output values-presentation values output layer 600 and command generation output layer 803

The presentation values layer 600 serves as input to the presentation layer 401 that presents the system state to the user as display/audio means, output layer 601 to the user.

Input layer 601 is display or audio to the user of the physical system status or network entities, user action layer 400 is the result of evaluation by the user of the state of the system and if or what action need to be taken, output layer 602 are the commands the user submit for action to modify or correct the system state.

Input layer 803, command generation, and input layer 602, user commands, are processed in the actuator command layer 502 to result the output layer 802, actuator commands Input layer 802 of actuator commands is processed by the actuator action layer 503 to result the actuator action output layer 801.

The actuator action input layer 801, which could be an analog value is fed into the physical actuator layer 504 and results output layer 800, actions to modify physical system state Input layer 800 action is applied to the physical system—the gas generator-100, which result the physical system state output layer 700

The data flow is in a closed loop thus the feedback. The statistical relation may be analyzed and evaluated based on statistical probabilistic relations between the various input and output layers-thus the Bayesian mentioning. The Bayesian approach is just an example of a method to use the statistical relations to determine probabilities of events and probability of false alarm rates.

Hereafter is presented an example of a malware infecting a program that will present a systematic analysis, efficient as compared to the general approach to anomaly detection that allow to locate accurately infected programs by malware.

The example used is of the gas generator (100) and from the discussion it will be apparent to any person skilled in the art hoe to apply the approach to similar systems and networked computing systems.

In the example the focus will be on three measurements-temperature, pressure, and flow of gas—the raw sensor measurement layer 702 will include these three values. If they are presenting a normal operation of the gas turbine there is high probability that the gas generator 100 operates and controlled properly by the monitoring operators.

Let assume that malware infects programs of the processor sensor measurements layer 202 and alters the processed sensor output layer 703 to cause the operator action to increases the data flow.

Anomaly detection initial operation will be made on processed sensor output layer 703 since it is less noisy and as result anomaly may be analyzed with higher fidelity-higher probability of detection of anomaly while maintaining a lower rate of false alarm rates.

Such action could be detected by evaluating the processed sensor output layer 703 or in case of sophisticated malware infecting multiple processor sensor measurements layer 202 the anomaly will not be detected in the 703 layer.

To avoid such masking of malware each sensor measurement raw data of layer 702 will be analyzed and evaluated for anomalies against its processed sensor measurement of layer 703. Raw temperature measurement of layer 702 against processed temperature measurement of layer 703, raw pressure measurement of layer 702 against processed pressure measurements of layer 703, and so on.

The basis for the anomaly detection between raw measure and processed measure is made based on knowledge of the pair of data relations that has been developed as previously described in the specification-mathematical models, simulations or machine learning techniques as discussed in many details in other literature.

By splitting the analysis into several processes (three in this case-one layer evaluation and two sensor pair raw/processed) the complexity is reduced greatly and the fidelity is improved.

Though the analysis of the processed temperature measurement of layer 703 will not indicate an anomaly the measurements pairwise will detect presence of malware infection of the processing programs, altering the processed data to cause the monitoring operators to take an action that will cause damage or malfunction of the gas generator 100 that could further propagate into the electrical grid.

Figure 4:
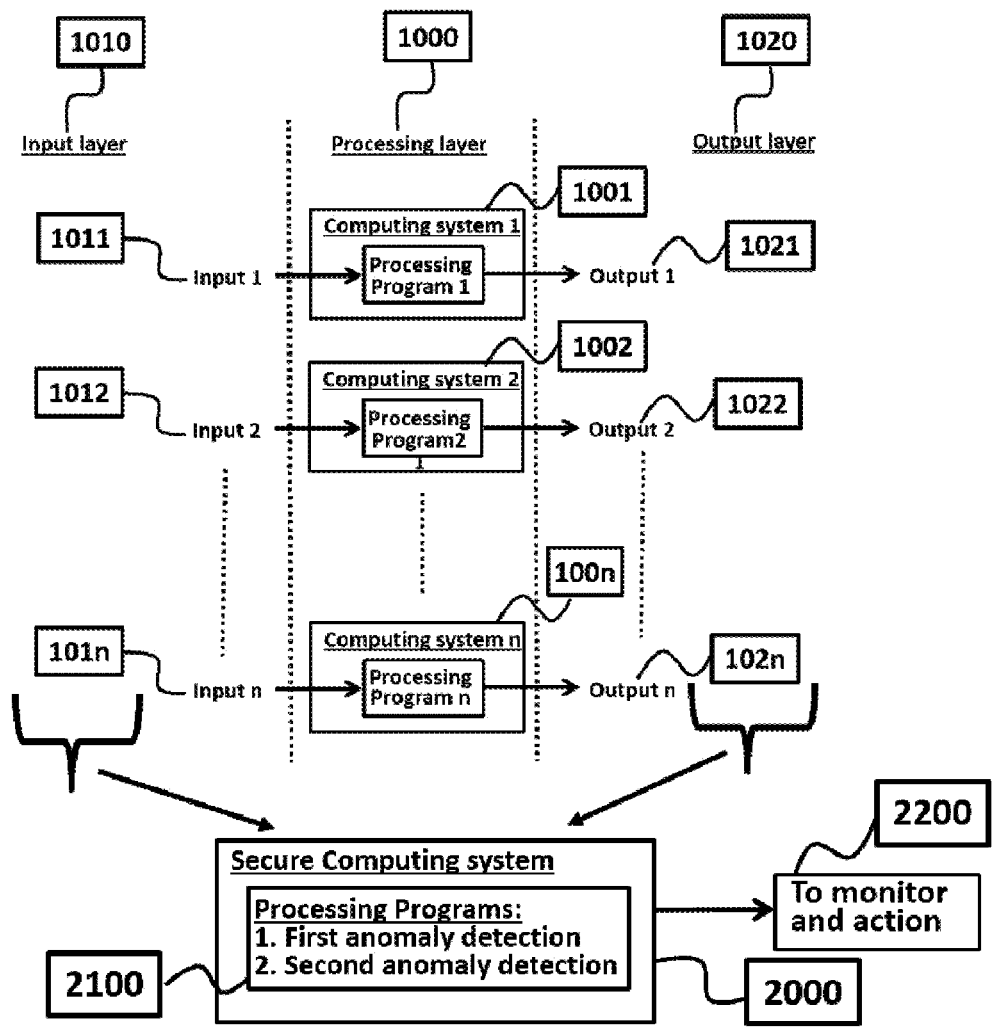
FIG. 4 Depicts the specific layers organization-processing, input, and output layers.

Before turning to FIG. 4 details several points are clarified:

There are three physical layers—the physical system 100 which state and operation is monitored and modified, the physical sensors 200 layer that measures activity of the physical system 100, and the actuators 504 layer that modifies the physical 100 state and operation.

Those three physical layers (100, 200, and 504) are referred to as a closed system-meaning that there is no access to the physical connections from the physical system 100 of the connection 700 to the sensors 200 or of the connection 800 to the actuator 504.

This implies that anomaly of the raw sensor measurements 701 may indicate fault of the physical systems 100 or certain sensors 200.

Same is true for the actuators 504, anomaly of actuator action 801 is not indicative of potential anomaly operation/action of the actuators 504 or the physical system 100.

Worth noting-analysis of both raw sensors measurements 701 layer and actuator 505 actuator action 801 layer could provide valuable information that could help in locating specific faulty elements of these three physical layers- physical system 100, sensors 200, and actuators 504.

Similar considerations are with regard to the presentation 601 layer and actuator command 802 layer.

The presentation 601 layer allow a user or a remote external entity to evaluate the situation.

Based on such evaluation actions 802 layer may be taken.

Anomaly analysis of the presentation 601 layer and the commands action layer 802 could indicate of a malicious action by insider or external entity.

Before continuing with detail explanation of FIG. 4 an illustration of the idea why segmentation of big data to detect anomaly is preferred.

Let assume that all values are given as 8 bit numbers. A pair of values (Raw data and processed data for a specific sensor) will result 65,536 possible cases.

If two sensor are evaluated with a conventional approach—the number of cases jumps to 4,294,967,296

By only evaluating the temperature of a gas generator anomaly may be detected—the temperature being out of range, high or low could be a single indicator of a malfunction. For critical cases this could allow for a speedy reaction to avoid damages.

But this is not enough. It is required, a process and method could be implemented to specifically resolve the and find the source—the physical system, the gas generator, or some programs of the network that alter data to cause the physical system to operate out of range or direct tampering with the temperature measure by modifying the program(s) that process the temperature measure.

Legacy anomaly detection algorithms are not taking advantage of such attributes of big data-they attempt to create a general mean to define normal states based on ALL the available information. For a network that could include 100's or even 1000's of variables, some presented as floating point values, this could become an analysis of an enormous endeavor.

The suggested approach is designed to avoid this waste of resources and provide focused high quality solution.

By means of example a gas generator system is considered

The gas generator state is critical to assure proper and safe operation—an example of a measure could be gas flow: sensed and measured and gas flow valves are controlling the flow and shut off switches, Sensors Measure State of the Generator Actuators Change State of the Generator Fusing measurements—of same or different sources are combined to present to operator an integrated view for decision making to command the actuators action.

Malware sets a false state of the gas generator by altering sensors measure

Malware Effect and Causes Damage to the Generator by Altering Actuators Actions

Malware masks the real gas generator state, as example the gas flow, and the operator as result will take erroneous action and will issue damaging commands.

Future infection should anticipate multiple malware infections and system designs need to defeat such infections.

It is important to realize that NECESSARY AND SUFFICIENT CONDITIONS TO DETECT AN INFECTED PROGRAM IS THAT AN INPUT PROCESS DOES NOT MATCH THE RESPECTIVE OUTPUT PROCESS.

FIG. 4 is presented to clarify the invention in terms of the claims as detailed in the claim section and make it easier for an examiner to understand the innovation and assist in a speedy prosecution.

As described in details before, a network in which data flows from one group of processing elements to the next is more efficiently and accurately managed by handling each such group separately. For example, determining the integrity of the data and processes by means of anomaly detection algorithms will be carried on the segments with less processing power and better accuracy as measured by PD vs. PFAR.

Segmentation of a Network into LAYERS:

Dividing the network nodes along the data flow into groupings that, as depicted in FIG. 4, includes three sublayers-Processing Layer 1000, Input Layer 1010, and Output Layer 1020.

Worth noting that the segmentation into groups of processing flow might be for several in the same level—for example if there are three gas generators the sensors and their respective processing inputs and outputs of the processing will be grouped into three layers, each processed separately.

At the extreme-a network of home meters will have for each home a layer that could include a single computing system running a single processing program, receiving a single process input and resulting a single process output For a Network of Nodes Comprised of Layers A layer includes a processing layer 1000, an input layer 1010, and an output layer 1020

The Processing Layer 1000 comprised of Computing Systems 1001, 1002, . . . 100*n*.

The Computing Systems (1001 or 1002 or . . . 100*n*) support and running a Processing Programs respectively 1, 2, . . . n.

The processing layer 1000 receives the "input" layer that is processed by the processing programs 1, 2 . . . n running by the computing systems 1001, 1002, . . . 100*n* of the processing layer 1000 and results the "output" layer 1020

The processing program (one of 1, 2 . . . n), of the processing layer 1000, is associated with a "process input" (1011 or 1012 Or . . . 101*n*) and a "process output" (1021 or 1022 or . . . 102*n*) and the processing program (one of 1, 2, . . . n), process the process input (1021 or 1022 or . . . 102*n*) to result a process output (1021 or 1022 or . . . 102*n*)

A secure computing system 2000 receives input layer 1010 data (1011, 1012, or . . . 101*n*) and output layer 1020 data (1021, 1022, or . . . 102*n*). The data is collected over the network according to the programs input requirements.

The secure computing system 2000 includes processing programs 2100 of which are a first anomaly detection 1 algorithm and a second anomaly detection 2 algorithm.

The first anomaly detection 1 algorithm verify integrity of the input layer 1010 or the output layer 1020 by identifying deviation from accepted values The second anomaly detection 2 algorithm evaluates a process input (1011 or 1012 Or . . . 101*n*) against a respective process output (1021 or 1022 or . . . 102*n*) to determine the processing program (1, 2, or . . . n), processing the input data to result the perspective output data, executed by the computing system (1001, 1002, or . . . 100*n*) of the processing layer 1000.

The secured computing system 2000 is preferably physically separated from the computing systems of the processing layer 1000 to avoid from infected system with malware to defeat the anomaly detection algorithms.

The secure computing system 2000 is communicating to monitor or action 2200 the results of the anomaly detection first and second algorithms, allowing operators to evaluate the results and take action or if desired an immediate action may be taken automatically to avoid damages.

The first anomaly detection algorithm maybe developed based on known probability distribution of the input layer 1010 or the output layer 1020 to derive normal and anomaly states of the input layer or the output layer. It is important to understand that the INNOVATION is in realizing that no need to find anomalies in a single grouping of ALL input and output layers values—it is unnecessary computation intensive and also adds "noise" which dilute the Probability-of-Detection/False-Alarm-Rate. Knowing the probability distribution of the individual Input layer 1011 values (1011, 1012, . . . 101*n*) or the individual Output layer 1012 values (1021, 1022, . . . 102*n*) allow for the use of well-practiced algorithms to derive the combined probability distribution and calculate the basis to set for desired probability-of-detection (PD) and False-Alarm-Rate (FAR). A point for consideration is the understanding that the importance of setting the PD before damage occurs and for timely reaction. The FAR is set based on the computational and the reactions to such to allow for manageable response in case of a false alarm.

The first anomaly detection algorithm could be also developed based on simulation techniques to derive normal and anomaly states of the input layer 1011 or the output layer 1020. Here simulation techniques that are used to create groupings of Input or Output values are used to find the distribution of values and utilize statistical tools to derive PD and FAR values.

As last resort the first anomaly detection algorithm maybe developed based on machine learning and AI techniques analysis of the input layer 1011 or the output layer 1020 to derive normal and anomaly states of the input layer 1011 or the output layer 1020. There are various techniques that are described in great details in the literature—from off-line data analysis, supervised or non-supervised to online, real time monitoring of group of values. The analysis of such provides the statistical information required to determine normal operation and anomaly operation and derive a certain level of PD and FAR.

The first anomaly detection algorithm maybe developed based on any combination of known probability distribution or simulation or AI and machine learning techniques to derive normal and anomaly states of the input layer or the output layer The second anomaly detection algorithm maybe developed based on known probability distribution of individual process input (1011, 1012, . . . 101*n*) and corresponding process output (1021, 1022, . . . 102*n*), to derive discrepancy between process input and process output. The statistical relation between a process input (1011, 1012, . . . 101*n*) and a corresponding process output (1021, 1022, . . . 102*n*) is calculated allowing for pair values of input data and corresponding output data to derive PD and FAR for such occurrence. In other words, for a given input value processed by a processing program (1, 2, . . . n) of the processing layer 1000 there is an anticipated corresponding output value—this value has a certain distribution that is a function of the input value.

The second anomaly detection algorithm maybe developed based on simulating the relation between input process (1011, 1012, . . . 101*n*) and output process (1021, 1022, . . . 102*n*) to derive discrepancy between process input and process output (1021, 1022, . . . 102*n*). The simulation will establish the statistical dependency between input value and corresponding output value.

The second anomaly detection algorithm maybe developed based on AI or machine learning techniques to derive discrepancy between process input (1011, 1012, . . . 101*n*) and process output (1021, 1022, . . . 102*n*). The AI or machine learning techniques will establish the statistical dependency between input value and corresponding output value.

The second anomaly detection algorithm maybe developed based on any combination of known probability distribution or simulation or AI and machine learning techniques to derive discrepancy between process input (1011, 1012, . . . 101*n*) and process output (1021, 1022, . . . 102*n*) based on the statistical dependency between input value to corresponding output value Detection of anomaly by the first anomaly detection algorithm indicate an issue with the data flowing or used by the network entity which could result from faulty operation of the physical system or with a processing program Based on the anomaly detection analysis results infected processing program (1, 2, . . . n) with malware or errors may be identified-discrepancies detected by the second anomaly detection algorithms indicate malfunction of the processing programs (1, 2, . . . n)

How to Take Advantage of the Innovation?

Example of Preferred Embodiment Utilized in a Sensor Rich Network

Level zero is typically referring to the data of the sensors raw measurements.

Level one is the level of the sensor processed measurements.

Ass example, a gas generator may include a multitude of sensors-temperature, pressure, flow, vibration, humidity, electrical values . . ..

Temperature and pressure could be defined as the critical values, meaning that malware altering this information could lead to irrecoverable situation The sensors raw measurements are the input layer. The sensors processed measurements are the output layer.

Analysis of the output layer might be preferred for efficiency even though the input layer analysis would be the indication for the physical system, sensors, and actuator health. The raw sensors measurements are usually noisy and as result to achieve a desired level of probability of detection could result intolerable false alarm rate.

The first anomaly detection algorithm of the sensor processed measurements is carried out and then specific further analysis is made by means of the second anomaly detection algorithm.

Only two analysis are carried out in this example by means of the second anomaly detection algorithm for the temperature raw measurement against the temperature processed measurement and pressure raw measurement against the pressure processed measurement.

If no anomaly is detected by the first and second anomaly detection algorithms means normal operation.

If no anomaly is detected by the first anomaly detection algorithm and the second detects anomaly in one of the temperature or pressure or both this will indicate a faulty program with suspicious of malware.

If anomaly is detected by the first anomaly detection algorithm and no anomaly is detected by the second anomaly detection algorithm this could indicate faulty programs with suspicious malware action.

Anomaly detected by both types (first and second) of the anomaly detection algorithms may indicate a fault with the physical system.

The anomaly detection supports further detailed analysis of events and timely reaction to risky events due to system failure or programs failure.

As final note—to determine a problem with physical elements integrated system (physical system, sensors, and actuators) only TWO layers need to be analyzed to indicate a fault: the sensors raw measurements and the actuator actions values.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method to effectively locate a program infected with malware:
    a network comprised of at least two computing system;
    a first computing system includes a first processor and a first memory;
    a first program stored in the first memory and executed by the first processor;
    the first program receives first input data to be processed by the first program to produce a first output data;
    a second computing system includes a second processor and a second memory;
    a second program stored in the second memory and executed by the second processor;
    the second program receives second input data to be processed by the second program to produce a second output data;
    an input layer comprised from at least two input data sets, the first input data and the second input data;
    an output layer comprised from at least two output data sets, the first output data and the second output data;
    enabling anomaly detection algorithms by computing normal states for data sets, output layer or input layer, first input data and first output data, and second input data and second output data;
    a first anomaly detection algorithm applied to the input layer or to the output layer;
    a second anomaly detection algorithm applied to a data set comprised of the first input data and the first output data
    or
    a third anomaly detection algorithm applied to a data set comprised of the second input data and the second output data;
    the results of the first anomaly detection algorithm, the second anomaly detection algorithm, and the third anomaly detection algorithm are evaluated to discover variations from the computed normal states to determine failure of the first program and/or the second program.

2. A first anomaly detection algorithm according to the method of claim 1 is developed based on known probability distribution of an input layer or an output layer to derive normal and anomaly states of the input layer or the output layer.

3. A first anomaly detection algorithm according to the method of claim 1 is developed based on simulation techniques to derive normal and anomaly states of an input layer or an output layer.

4. A first anomaly detection algorithm according to the method of claim 1 is developed based on machine learning and artificial intelligence (AI) techniques analysis of an input layer or an output layer to derive normal and anomaly states of the input layer or the output layer.

5. A first anomaly detection algorithm according to the method of claim 1 is developed based on any combination of known probability distribution or simulation or AI and machine learning techniques to derive normal and anomaly states of an input layer or an output layer.

6. A second and a third anomaly detection algorithm according to the method of claim 1 is developed based on known probability distribution of a process input and a corresponding process output to derive discrepancy between the process input and the corresponding process output.

7. A second and a third anomaly detection algorithm according to the method of claim 1 is developed based on simulating the relation between a process input and a corresponding output process to derive discrepancy between the process input and the corresponding process output.

8. A second and a third anomaly detection algorithm according to the method of claim 1 is developed based on AI or machine learning techniques to derive discrepancy between a process input and a corresponding process output.

9. A second and a third anomaly detection algorithm according to the method of claim 1 developed based on any combination of known probability distribution or simulation or AI and machine learning techniques to derive discrepancy between a process input and a corresponding process output.

* * * * *